United States Patent
Si

(10) Patent No.: US 6,259,912 B1
(45) Date of Patent: Jul. 10, 2001

(54) APPARATUS AND METHOD FOR MEASUREMENT OF TRANSMISSION POWER OF BASE STATION AND CALL-TEST OF BASE STATION IN A DIGITAL MOBILE COMMUNICATION SYSTEM

(75) Inventor: Jin-il Si, Sungnam (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/196,062

(22) Filed: Nov. 19, 1998

(30) Foreign Application Priority Data

Nov. 20, 1997 (KR) .................................................. 97-61317

(51) Int. Cl.$^7$ ...................................................... H04Q 7/20
(52) U.S. Cl. .......................... 455/424; 455/423; 455/67.1
(58) Field of Search ................................... 455/423, 424, 455/425, 67.1, 67.4, 522, 226.1, 226.2

(56) References Cited

U.S. PATENT DOCUMENTS

| | | | |
|---|---|---|---|
| 4,443,661 | 4/1984 | Kubo | 179/2 EB |
| 5,152,009 | * 9/1992 | Sato | 455/266.1 |
| 5,230,091 | 7/1993 | Vaisanen | 455/88 |
| 5,313,656 | 5/1994 | Vaisanen et al. | 455/67.1 |
| 5,335,362 | * 8/1994 | Vaisanen et al. | 455/67.4 |
| 5,337,006 | 8/1994 | Miyazaki | 330/130 |
| 5,425,076 | * 6/1995 | Knippelmier | 455/424 |
| 5,471,649 | 11/1995 | Rees et al. | 455/67.4 |
| 5,768,689 | * 6/1998 | Borg | 455/67.4 |
| 5,881,376 | * 3/1999 | Lundberg et al. | 455/67.4 |
| 5,930,707 | * 7/1999 | Vambaris et al. | 455/67.4 |
| 5,943,617 | * 8/1999 | Nakamura | 455/424 |
| 6,078,795 | * 6/2000 | Miyazaki | 455/226.2 |

* cited by examiner

Primary Examiner—Nay Maung
Assistant Examiner—Quochien B. Vuong
(74) Attorney, Agent, or Firm—Dilworth & Barrese, LLP

(57) ABSTRACT

Apparatus and methods for power detection and a test mobile unit for measurement of transmission power of a base station and performing a call-test of a base station in a mobile communication system. The apparatus includes a transmit power detection board (TPDB) 120 for converting the power of a radio frequency (RF) input signal to a digital value; a test mobile (TM) 130 for performing a call-test of base station; and a BTU (base station test unit) control and interface board assembly (BCIA) 110 for controlling the TPDB 120 and TM 130. The method includes the steps of sequentially varying the input power from a signal generator over the range of input power of a power detector and test mobile unit (PTMU) 100; sequentially storing a digital value corresponding to each varied input power level in an EEPROM 122 of TPDB 120 pursuant to a memory address provided by a control of BTU (base station test unit) control and interface board assembly (BCIA); storing a measurement error pattern in accordance with the temperature in EEPROM 122 and compensating the measurement error in accordance with a measured change of external temperature of the base station system by way of a temperature offset.

9 Claims, 2 Drawing Sheets

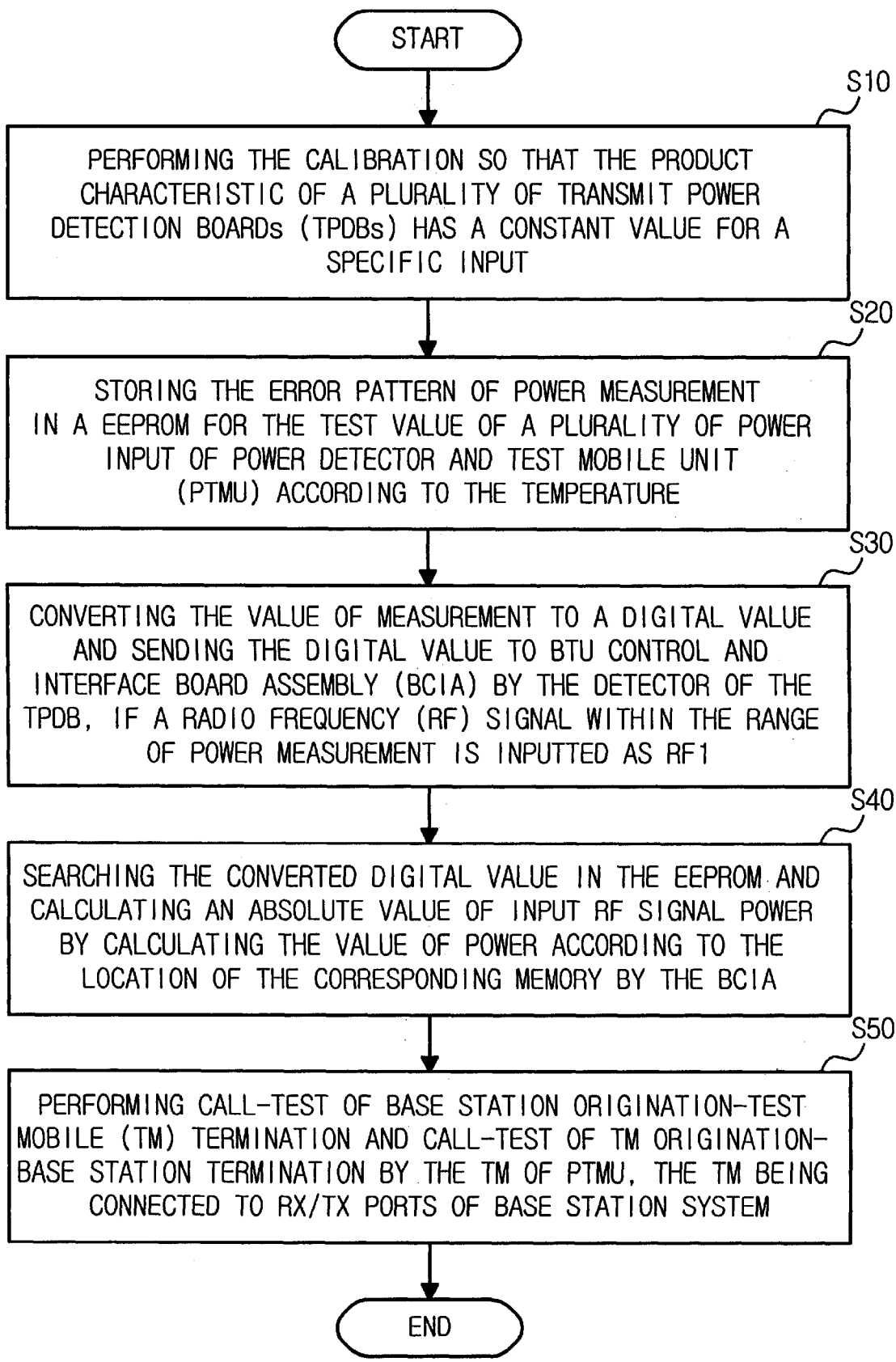

APPARATUS AND METHOD FOR MEASUREMENT OF TRANSMISSION POWER OF BASE STATION AND CALL-TEST OF BASE STATION IN A DIGITAL MOBILE COMMUNICATION SYSTEM

FIELD OF THE INVENTION

The present invention relates to generally to a power detector and test mobile unit (PTMU) for a base station, more particularly relates to temperature calibrated power detection apparatus and a test mobile unit for measurement of transmission power of a base station and call-test of base station in a code division multiple access (CDMA) digital mobile communication system.

DESCRIPTION OF THE RELATED ART

A conventional apparatus for use in testing a base station in a communications system is disclosed in U.S. Pat. No. 4,443,661. Such an apparatus transmits a signal to the base station and receives a reply signal from the base station in order to monitor the base station for problems within a transceiver portion of the base station. However, such a conventional apparatus only provides a general indication of whether the base station has a problem, it cannot specify the nature of the problem and cannot accurately determine the transmission power of the base station. If any power estimation is conducted by such a system, the estimation is prone to exhibit a low rate of accuracy due to changes in the environment outside the base station system, such as a temperature. Without knowing such parameters, prior art systems cannot fully evaluate the operational status of the base station.

SUMMARY OF THE INVENTION

The present invention is intended to provide apparatus and methods for power detection and a test mobile unit for measuring the transmission power of a base station as well as providing call-test function on a base station in a code division multiple access (CDMA) digital mobile communication system. Additionally, the present invention is intended to provide a method of calibration for the call-test function of the base station.

The power detection apparatus and a test mobile unit for measurement of transmission power of a base station and call-test of base station in a communication system includes a transmit power detection board (TPDB) for converting the strength of a radio frequency (RF) input signal to a digital value; a test mobile (TM) for performing a call-test of the base station; and a BTU (base station test unit) control and interface board assembly (BCIA) controlling the TPDB and TM.

In a method of calibration, a power input signal applied to a power detector and test mobile unit (PTMU) is sequentially varied by a signal generator and a digital value corresponding to each of the varied power input levels of the PTMU is sequentially stored in a EEPROM of the transmit power detection board (TPDB). The digital values are stored in accordance with a memory address under the control of the BTU control and interface board (BCIA) so that a plurality of PTMUs for measurement of transmission power of a base station and call-test of a base station in a code division multiple access (CDMA) digital mobile communication system, have a substantially constant value of measurement for a specific input power.

The methods for measurement of transmission power of a base station and performing a call-test of a base station in a code division multiple access (CDMA) digital mobile communication system include the steps of performing a calibration operation so that the product characteristic of a plurality of transmit power detection boards (TPDBs) have a substantially constant value for a specific input; storing an error pattern of power measurements in a EEPROM for the test value of a plurality of power input values to a power detector and test mobile unit (PTMU) according to a measured temperature; converting the value of measurement to a digital value and sending the digital value to a BTU control and interface board assembly (BCIA) by the detector of the TPDB, if a radio frequency (RF) signal within the range of power measurement is inputted as RF1; searching the converted digital values in the EEPROM and calculating an absolute value of input RF signal power by calculating the value of power according to the location of the corresponding memory by the BCIA; and performing call-test of base station origination-test mobile (TM) termination and call-test of TM origination-base station termination by the TM of PTMU.

Other objects and advantages of the invention will become apparent upon reading the detailed description and upon reference to the drawings.

BRIEF DESCRIPTION OF THE DRAWINGS

FIG. 2 is a flow chart illustrating a method for measurement of the transmission power of a base station.

DETAILED DESCRIPTION OF PREFERRED EMBODIMENTS

Figure 1:
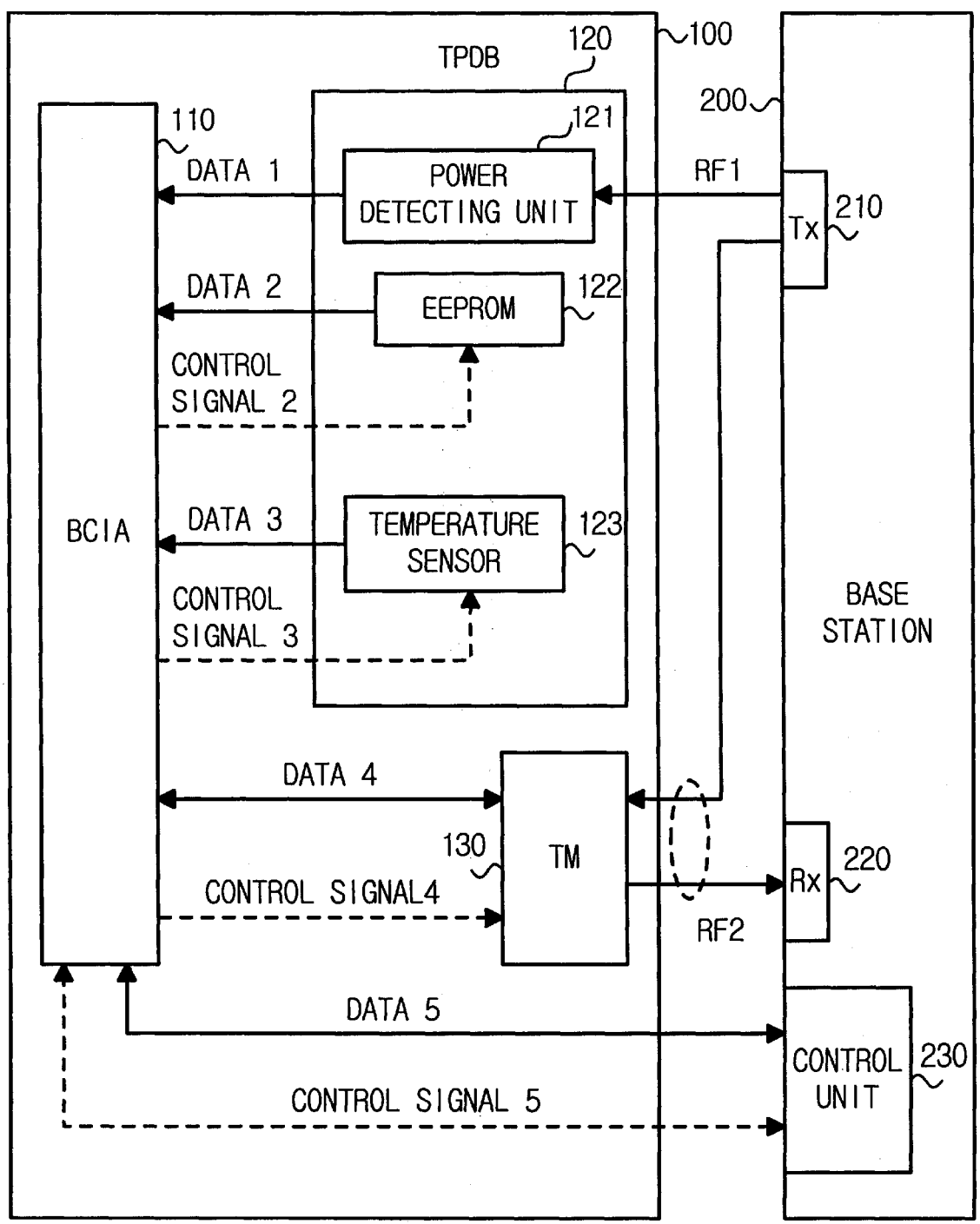
FIG. 1 is a block diagram illustrating the operational components of a power detection apparatus and a test mobile unit formed in accordance with the present invention.

The present invention will be explained in detail with reference to the accompanying drawings.

A preferred embodiment of a power detection apparatus with a test mobile unit for measurement of transmission power of a base station, and performing a call-test of a base station in a digital mobile communication system, such as a code division multiple access (CDMA) system, includes a transmit power detection board (TPDB) 120 which receives a radio frequency (RF) signal from a base station and converts the strength of the radio frequency (RF) input signal to a digital value. A test mobile (TM) 130 is included for performing a call-test of the base station. Preferably, the test mobile (TM) 130 will take the form of a mobile phone for performing such a test. A BTU (base station test unit) control and interface board assembly (BCIA) 110 is included and is operatively coupled to both the TPDB 120 and TM 130.

In accordance with the present invention, the TPDB 120 includes a power detecting unit 121 which converts the received RF signal to a digital signal; an EEPROM unit 122 for receiving and storing data from the BCIA 110 and providing the BCIA 110 with previously stored data; and a temperature sensor unit 123 for detecting the internal temperature of the TPDB 120 and transmitting the detected temperature data to the BCIA 110.

When the TPDB 120 converts an RF power input signal to a digital value, a calibration algorithm is used so that all power detector and test mobile units (PTMUs) 100 can provide a substantially constant value of measurement for a specific RF power input, despite differences in the product temperature of the TPDB 120 from unit to unit.

The TM 130 of PTMU 100 is connected to Rx/Tx ports 210, 220 of the base station 200 and performs both a call-test of base station origination-TM termination and a call-test of TM origination-base station termination. The TM 130 controls the origination-termination when the control unit 230 of base station 200 and BCIA 110 of PTMU 100 are interconnected.

In a preferred embodiment of a calibration algorithm according to the present invention, a power input signal provided to the power detector and test mobile unit (PTMU) 100 is sequentially varied by a signal generator. This is a factory calibration of the PTMU at the hardware level. In response, a digital value corresponding to each of the varied power input levels of the PTMU is sequentially stored in a EEPROM 122 of the transmit power detection board (TPDB) 120 pursuant to the memory address provided by the control of BTU control and interface board (BCIA) I 10. In this way, a plurality of PTMUs 100 can provide a substantially constant value of measurement for a specific input power.

The method according to the present invention for measurement of transmission power of a base station and performing a call-test of a base station in a digital mobile communication system also includes the step of performing a calibration operation such that the product characteristic of a plurality of transmit power detection boards (TPDBs) 120 has a substantially constant value for a specific input signal level (s10). An error pattern of power measurements is stored in EEPROM 122 for the test value of a plurality of power input levels to the power detector and test mobile unit (PTMU) 100 according to the temperature (s20). The temperature is measured when the base station orders the PTMU to measure the transmit power of the base station (i.e., the temperature measurement is performed simultaneously with the measuring of the transmit power).

Next, if a radio frequency (RF) signal within the range of power measurement is applied, the measured power value is converted to a digital value and the digital value is provided to the BTU control and interface board assembly (BCIA) 110 by the detector 121 of the TPDB 120 as RFI (s30). A searching step of the converted digital values in the EEPROM 122 is performed and an absolute value of input RF signal power is determined by calculating the value of applied RF power according to the corresponding memory location by the BCIA 110 (s40). The algorithm then progresses to perform a call-test of the base station origination-test mobile (TM) termination and a call-test of the TM origination-base station termination by the TM of a PTMU (s50).

The measurement values of the TPDB 120 exhibit a specific error curve within the range of operational temperatures of the PTMU 100 and the error curves for many kinds of test values of PTMU 100 exhibit similar error patterns.

The method for measurement of power of an RF signal and the method of calibration are described in more detail as follows. The TPDB 120 converts a RF power input signal to a digital value. However, the product characteristic of the TPDB 120 is different for each different TPDB 120. Therefore, it is necessary to perform a calibration operation such that all PTMU 100 will provide a substantially constant output value for a specific input power level. The product characteristic refers to the low level characteristics of the RF products such as a mixer, filter, MMIC amp, etc. within the TPDB PBA. These RF products have small differences for their own characteristics, thus, if a plurality of TPDBs are compared with each other, their characteristics are not exactly coincident with each other. The product characteristic represents the overall characteristics of the TPDB taking into account the different characteristics of the various components making up the same.

In the present method of calibration, the input power generated by a signal generator is sequentially varied over the range of power input of the PTMU 100 and digital values corresponding to each value of the applied, varied power input signal to the PTMU is sequentially stored in a EEPROM 122 of the transmit power detection board (TPDB) 120. The values are stored in accordance with a memory address provided by the BTU control and interface board (BCIA) 110. In this way, the TPDB 120 develops a calibration table in EEPROM 122 which includes a digital value for each applied input RF power level.

The measured value of power by the TPDB 120 has a specific error curve within the range of operating temperature of the PTMU 100. This is the result of the inherent temperature characteristics of the components used to form the PTMU 100. By observing an error curve resulting from the power measurement of a plurality of test values of PTMU 100, an error distribution is derived. The result is stored in EEPROM 122 according to the temperature. There are a large number of temperature measurement points for a sample PTMU. For example, at a specific temperature range from −30° C. to +80° C., the power is measured while varying the temperature at 1° C. intervals. If this is performed for the plurality of PTMUs, it is possible to get the temperature characteristic distribution of PTMUs for the temperature range −30° C. to +80° C. When a standardized point where the error is zero is fixed as the normal temperature of 25° C. and the mean of the distribution is a fixed value of measurement such that the error is zero, the power measurements for other temperatures have relatively specific error values.

If a RF signal within the range of measurement of power is applied to the power detecting unit 121, the detector of TPDB 120 converts the applied signal to a digital value and provides the digital value to BCIA 110. The BCIA 110 searches the digital values in the EEPROM 122 and calculates an absolute value of the applied RF signal power according to the corresponding error distribution for a given temperature which is stored in the EEPROM 122.

Referring to FIG. 1, a call-test of base station origination-test mobile (TM) termination and a call-test of TM origination-base station termination is performed using the TM 130 of PTMU 100 while connected to Rx/Tx 210, 220 ports of the base station, as RF2. The control of the origination-termination is performed when a control unit 230 of base station 200 and BCIA 110 of PTMU 100 are interconnected.

As stated above, the present invention makes it possible to accurately measure the transmission power being transmitted by the base station 200. The measurement accuracy is improved with respect to changes in the operating temperature of the base station by compensating for measurement errors according to a change of external temperature. By using TM 130, it is also possible to perform a call-test with the base station 200, thereby making it possible to verify the status of operation of a base station.

While the present invention is susceptible to various modification and alternative forms, specific exemplary embodiments thereof have been described in detail and illustrated in the drawings. It should be understood, however, that it is not intended to limit the invention to the particular forms disclosed, but on the contrary, the intention is to cover all modifications, equivalents, and alternatives falling within the spirit and scope of the invention as defined by the appended claims.

What is claimed is:

1. A power detection apparatus with a test mobile unit (PTMU) for measuring a transmission power of a base station and performing a call-test of a base station in a mobile communication system, the apparatus comprising:

a transmit power detection board (TPDB) for receiving a radio frequency (RF) transmission signal from a base station and for converting said RF transmission signal to a digital value, said TPDB comprising an EEPROM for storing said digital value in a memory address location;

a test mobile (TM) for performing a call-test function of the base station; and a BTU (base station test unit) control and interface board assembly (BCIA) for controlling said TPDB and said TM and for determining said memory address location of said EEPROM to store said digital value.

2. The apparatus as set forth in claim 1, wherein said TPDB comprises:

a power detecting unit converting said RF transmission signal to said digital value; and a temperature sensor unit detecting the internal temperature of said TPDB and transmitting said detected temperature data to said BCIA.

3. The apparatus as set forth in claim 1, wherein said TPDB further comprises a calibration algorithm, said calibration algorithm being used so that all power detector and test mobile units (PTMUs) provide a substantially constant value of measurement for a specific RF power input despite temperature variations of said TPDB.

4. The apparatus as set forth in claim 1, wherein said TM tests base station origination-TM termination and said TM further tests TM origination-base station termination, said TM being connected to both a Rx and a Tx port of the base station.

5. A calibration algorithm for a power detector and test mobile unit (PTMU) comprising the steps of:

sequentially varying a power input signal provided by a signal generator; and sequentially storing a digital value corresponding to each level of said varied power input in a EEPROM of a transmit power detection board (TPDB) pursuant to a memory address determined by a BTU control and interface board (BCIA), whereby a plurality of PTMUs for measurement of transmission power of the base station and call-test of the base station in a mobile communication system can provide a substantially constant value of measurement for a specific input power signal.

6. A method for measurement of transmission power of a base station performing a call-test of a base station in a mobile communication system, comprising the steps of:

performing a calibration operation, such that the product characteristic of a plurality of transmit power detection boards (TPDBs) provide a substantially constant value for a specific input power level;

storing an error pattern of power measurements in an EEPROM at an address location determined by a BTU control and interface board assembly (BCIA) corresponding to the value of a plurality of power input levels to a power detector and test mobile unit (PTMU) according to a measured temperature;

converting the value of power measurement to a digital value and sending said digital value to said BTU control and interface board assembly (BCIA) by the detector of said TPDB, if a radio frequency (RF) signal within the range of power measurement is inputted as RF1;

searching said converted digital values in said EEPROM and calculating an absolute value of an applied RF signal power according to the location of the corresponding memory determined by the BCIA; and performing a call-test of a base station origination-test mobile (TM) termination and a call-test of TM origination-base station termination by said TM of PTMU.

7. The method as set forth in claim 6, wherein said power is transmission power of a base station.

8. The method as set forth in claim 6, wherein control of said origination and termination is performed when a control unit of a base station and a BTU control and interface board assembly (BCIA) of a power detector and test mobile unit (PTMU) are connected.

9. The method as set forth in claim 6, wherein the measurement error according to a change of external temperature is compensated for by a temperature offset value.

* * * * *